Figure 1:
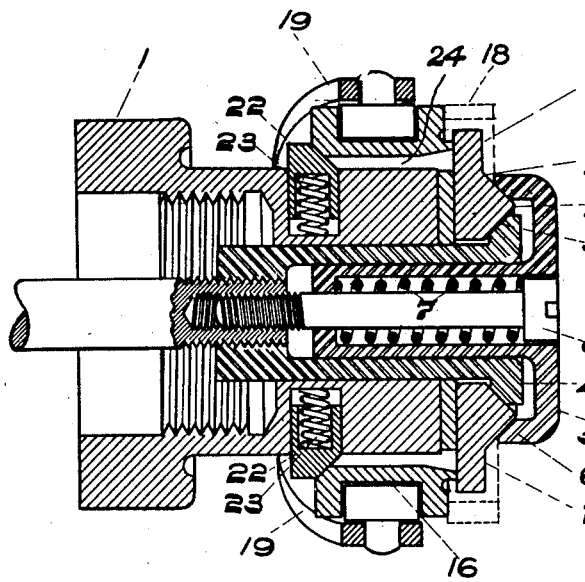

D. F. DOMIZI.
CHUCK FOR PISTON RINGS.
APPLICATION FILED APR. 21, 1911.

1,098,025.

Patented May 26, 1914.

2 SHEETS—SHEET 1.

Witnesses
C. M. Read.
Laura S. Inman.

Inventor
DAVID F. DOMIZI

By Edward R. Inman
Attorney

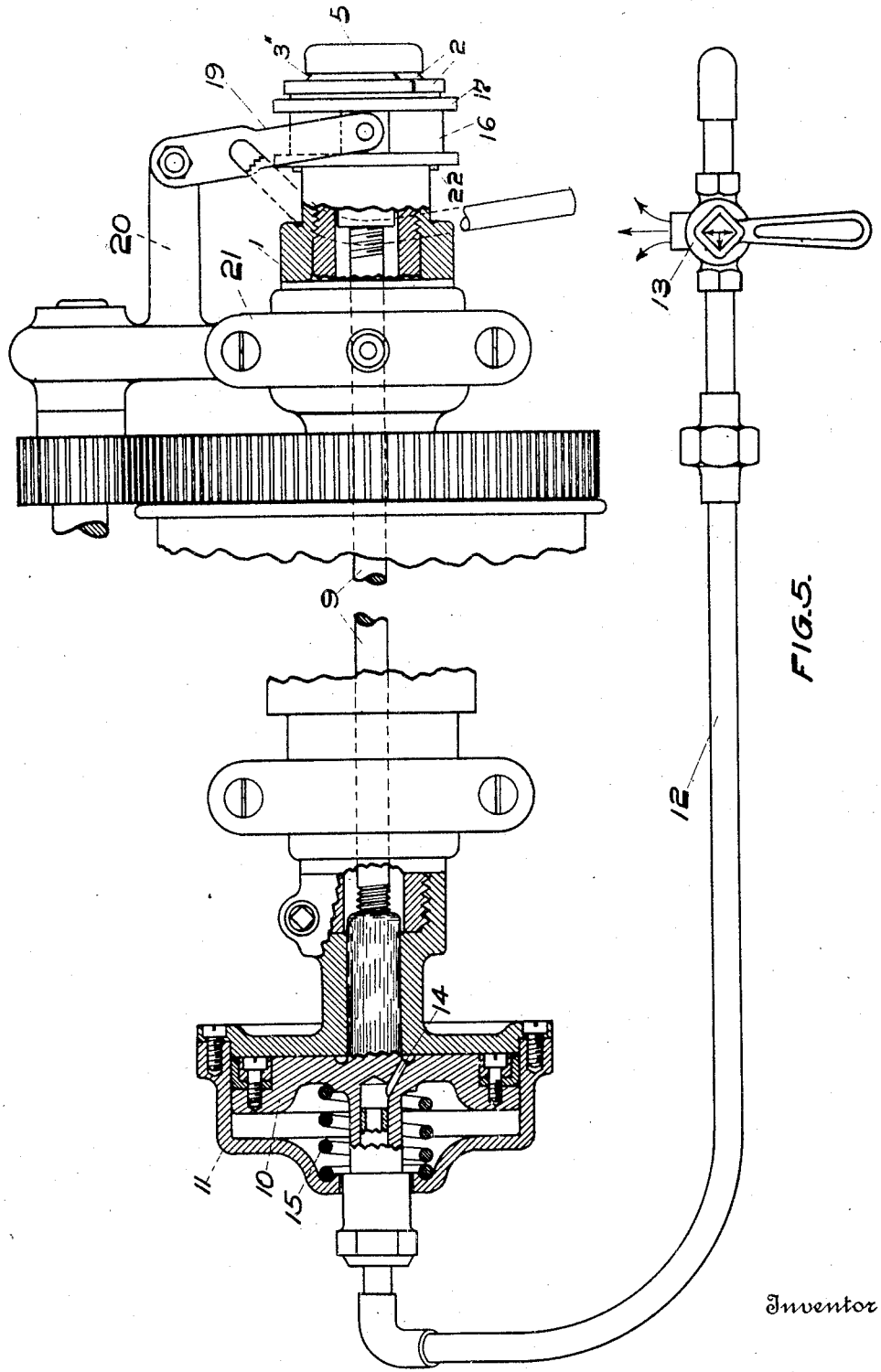

UNITED STATES PATENT OFFICE.

DAVID F. DOMIZI, OF FRANKLIN, PENNSYLVANIA.

CHUCK FOR PISTON-RINGS.

1,098,025. Specification of Letters Patent. Patented May 26, 1914.

Application filed April 21, 1911. Serial No. 622,579.

*To all whom it may concern:*

Be it known that I, DAVID F. DOMIZI, citizen of the United States, residing at Franklin, in the county of Venango and State of Pennsylvania, have invented certain new and useful Improvements in Chucks for Piston-Rings, of which the following is a specification.

The object of my invention is to provide an expanding chuck for internally engaging and holding various forms of annuli, especially piston packing rings, when the lateral edges of same are to be faced or finished. If the periphery and the internal circumference of such rings are concentric, my chuck may be used for finishing the periphery of the ring also, before it is cut open, if desired.

My improved chuck is designed to be attached to the live spindle of any suitable machine tool, such as a lathe, grinding machine, milling machine and the like, and more especially to a machine to which is applied my improved machine for grinding the lateral edges of piston rings, as shown in a certain application for Letters Patent of the United States, filed by me on the 20th day of January, 1912, Serial No. 672,503.

In the drawings I have shown the preferred form of construction by which my inventive idea may be mechanically embodied, but details of construction could be considerably modified without departing from the scope of my invention.

The various figures of the drawings are as follows:—

Figure 2:
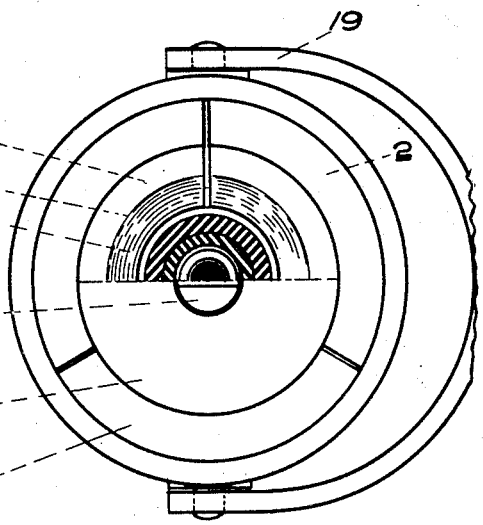
Figure 3:
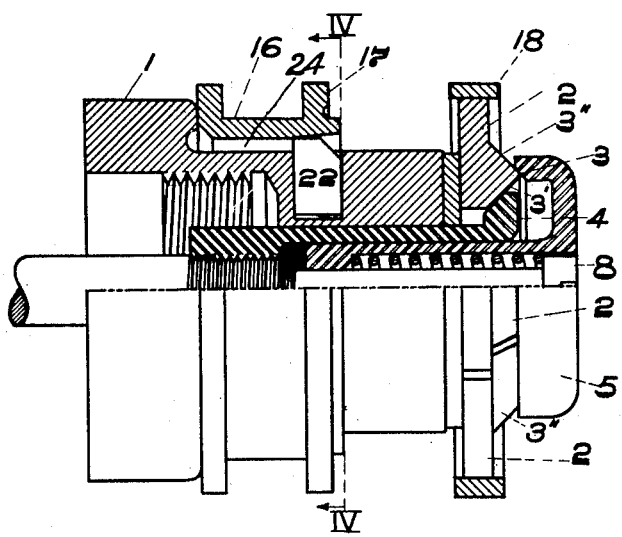
Figure 4:
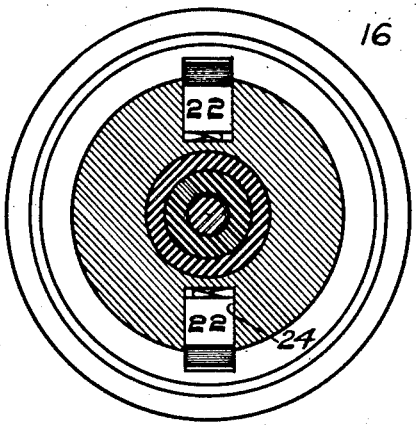

Figure 1 is a central, longitudinal section of my improved chuck in the work-receiving position. Fig. 2 is an end view of the outer end of the chuck, portions being removed to expose other portions to view. Fig. 3 is a side elevation partly in longitudinal section, showing the chuck in the working position with a ring engaged thereby in readiness to be operated upon. Fig. 4 is a transverse section on line IV—IV of Fig. 3. Fig. 5 shows my improved chuck attached to the spindle of a machine tool, together with a pneumatic device for actuating the chuck.

The same reference characters are applied to identical parts in all the views.

The construction of my improved chuck is as follows: The attaching element of my improved chuck, whereby the same is attached to the live spindle of a machine tool, consists of a cylindrical body 1 suitably arranged to be screwed upon said spindle. At the outer end of said body is mounted a divided disk composed of sections 2, 2, 2, which sections are designed to move bodily outwardly in a line of true perpendicularity to the axis of the chuck. Said sections 2 constitute the jaws of the chuck, which expand into or internally engage the opening of the ring to be finished, and cause said ring to revolve with the chuck and the spindle to which the chuck is attached. Said sections 2 are provided with a V-shaped annular projection 3 upon their outer face, the respective slopes 3' and 3" of which are acted upon to expand and to contract said sections. The inner slope 3' is acted upon by the head of a plunger 4 to expand the jaws, and the outer slope 3" is acted upon by the inwardly-projecting flanges of a spring-actuated head 5 to contract said jaws. Plunger 4 is provided with an expanding head, the inner face of which conforms to the juxtaposed slope 3' of the jaws 2, and when said plunger is drawn inward, jaws 2 are caused to move outward, as will be readily understood by an inspection of Figs. 1 and 3. Head 5 is provided with an inwardly-projecting flange 6, and the inner edge of said flange conforms to and bears upon the juxtaposed face 3" of jaws 2. Flange 6 is caused to exert a continuous pressure upon jaws 2 by means of a spiral spring 7, the tension of which is regulated by a screw 8, against the head of which the outer end of the spring 7 bears. By this means jaws 2 are normally spring-held in the contracted position.

Plunger 4 is attached by means of a rod 9 to an actuating device consisting of a piston 10 which is operative in a cylinder 11. Compressed air is preferably the medium by which piston 10 is operated, and this air is admitted from any suitable source of supply, through a pipe 12, in which there is a three-way cock 13, and as the air is admitted through said pipe 12, it passes through duct 14 and moves said piston so as to compress spring 15, and this movement causes plunger 4 to be drawn into jaws 2 and expands the same, and at the same time the flexibility of spring 7 will permit head 5 to move outward, which readily permits the expansion of jaws 2 as shown in Fig. 3. When the three-way cock 13 is turned to permit the air to escape from cylinder 11, spring 15 returns piston 10 to the normal position shown in Fig. 5, this also moves plunger 4 outward, and the pressure of head 5 upon jaws 2 will retract them to their normal position shown in Fig. 1. So far as the inventive idea here set forth is concerned, however, it is immaterial by what means plunger 4 is actuated, as the particular means for actuating same is no part of the invention here sought to be secured by Letters Patent. The pneumatic device is shown for the purpose of illustrating how the chuck may be operated, said device having been found very satisfactory in actual practice.

It is desirable to provide means for securing a true perpendicular alinement of the lateral edges of the ring as it is placed upon and engaged by the chuck, and for this purpose I employ a gage consisting of a sleeve 16 which is adapted to slide longitudinally upon body 1. The front end of said sleeve is adapted to contact with the rear face of the jaws 2 as shown in Fig. 1, and approximate to said front end is a limiting flange or stop 17 against which the approximate edge of the ring 18 is placed when it is to be chucked; this insures a correct vertical alinement of the ring, whereas said alinement might otherwise not be true, and the ring would wabble more or less as it revolved, and the accurate results would thus not be obtained which my chuck is designed to and does secure by means of said sleeve, which is one of the valuable features of my chuck. After the ring has been properly located and secured by the chuck, sleeve 16 is slipped back to the position shown in Fig. 3, where it is out of the way of the finishing tool and in no wise interferes with the finishing of the ring. Any other suitable means whereby the proper alinement of the ring perpendicularly to the axis of the chuck, is effected, may be employed, however, without departing from the spirit of my invention.

Any convenient means may be employed for shifting sleeve 16 longitudinally, as above stated. I have here shown a yoke 19 which is attached at one end to a bracket 20 attached to the head-stock 21 of a lathe, and a handle (not shown) may be attached to said yoke for convenient manipulation. It is desirable to provide some means for retaining sleeve 16 in the respective positions shown, and for this purpose I employ the spring latches 22, 22, which consist of square pins, each seated in square sockets in sleeve 1; they are each pressed outward by a spiral spring 23. The forward face of each pin is beveled and the rear end of each slot 24 in sleeve 16 is chamfered to conform to said beveled face, as will be clearly understood by a reference to Fig. 1, hence pins 22 must be considerably compressed as sleeve 16 moves to the rear position shown in Fig. 3. The main object of pins 22 is, to insure the proper retention of sleeve 16 in the forward ring-alining position of Fig. 1, so that the position of the ring will not only be perpendicularly true, but its position will always be the same, laterally considered, and this eliminates the necessity of lateral adjustments of the finishing tool, thereby effecting considerable saving of time and insuring greater accuracy and uniformity in width of the finished rings. Jaws 2 are not rigidly attached in any way to body 1, but the pressure between the opposing faces of said jaws and the end of said body is sufficient to cause the jaws to revolve with the body at all times. In the drawings, I have shown a washer interposed between the end of body 1 and jaws 2, but this is not essential.

What I claim and desire to secure by Letters Patent, is:

1. A chuck of the class specified, consisting of a cylindrical body arranged to be attached to the live spindle of a machine tool, a plunger passing through said body, actuating means attached to said plunger, and arranged to actuate the same longitudinally, a head upon the outer end of said plunger, perpendicularly movable jaws positioned against the outer end of said body and arranged to be perpendicularly expanded by the inward movement of said plunger, and a spring-held, contracting head, bearing upon the outer face of said jaws and arranged to hold same normally in a contracted position.

2. In a chuck for piston rings, the combination of a cylindrical body adapted to be attached to the live spindle of a machine tool, jaws secured to said body and arranged to be expanded in a line perpendicular to the axis of said spindle, means for expanding said jaws, means for normally contracting said jaws, and ring-alining means longitudinally movable upon said body and arranged for the lateral contact of one edge of such ring, for the purpose set forth, when the same is being chucked.

3. In a chuck for piston rings, the combination of a cylindrical body arranged to be secured to the live spindle of a machine tool, jaws secured to said body, expansible in a line perpendicular to the axis of said spindle, means for expanding said jaws, spring-actuated means normally holding said jaws in the contracted position, ring-alining means longitudinally slidable upon said body, for the purpose specified, and spring-actuated means tending to hold said alining means in the alining position.

4. In a chuck for piston rings, the combination of a cylindrical body adapted to be attached to the live spindle of a machine tool, jaws carried by said body and arranged to be expanded in a line perpendicular to the axis of said spindle, means for expanding said jaws, means normally contracting said jaws, ring-alining means arranged to contact with a lateral edge of said ring for the purpose of causing the lateral alinement thereof, in a line of true perpendicularity to the axis of said spindle.

In testimony whereof I affix my signature in presence of two witnesses.

DAVID F. DOMIZI.

Witnesses:
    JOHN L. NESBIT,
    E. T. STEVENSON.